(12) United States Patent
Smyth et al.

(10) Patent No.: US 8,589,559 B2
(45) Date of Patent: *Nov. 19, 2013

(54) CAPTURE OF CONTENT FROM DYNAMIC RESOURCE SERVICES

(75) Inventors: Gavin Smyth, Huntingdon (GB); Natasa Milic-Frayling, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/267,444

(22) Filed: Oct. 6, 2011

(65) Prior Publication Data

US 2012/0030317 A1 Feb. 2, 2012

Related U.S. Application Data

(63) Continuation of application No. 11/565,333, filed on Nov. 30, 2006, now Pat. No. 8,037,182.

(51) Int. Cl.
*G06F 15/16* (2006.01)
*G06F 15/173* (2006.01)

(52) U.S. Cl.
USPC ........... 709/226; 709/206; 709/207; 709/217; 709/228

(58) Field of Classification Search
USPC .......................... 709/206–207, 217, 226–228
See application file for complete search history.

(56) References Cited

U.S. PATENT DOCUMENTS

| | | | |
|---|---|---|---|
| 6,272,484 B1 | 8/2001 | Martin et al. | |
| 6,275,829 B1 | 8/2001 | Angiulo et al. | |
| 6,356,908 B1 | 3/2002 | Brown et al. | |
| 6,693,652 B1 | 2/2004 | Barrus et al. | |
| 6,732,161 B1 | 5/2004 | Hess et al. | |
| 6,789,170 B1* | 9/2004 | Jacobs et al. | 711/133 |
| 6,856,415 B1 | 2/2005 | Simchik et al. | |
| 6,864,904 B1* | 3/2005 | Ran et al. | 715/760 |
| 6,964,025 B2 | 11/2005 | Angiulo et al. | |
| 7,073,121 B2 | 7/2006 | Brown et al. | |
| 7,225,407 B2 | 5/2007 | Sommerer et al. | |
| 7,464,381 B1 | 12/2008 | Nickerson et al. | |
| 2003/0061360 A1* | 3/2003 | Chow et al. | 709/228 |

(Continued)

FOREIGN PATENT DOCUMENTS

| | | |
|---|---|---|
| EP | 1168203 | 1/2002 |
| EP | 1168204 | 1/2002 |

OTHER PUBLICATIONS

Chen et al., "Detecting Web Page Structure for Adaptive Viewing on Small Form Factor Devices", ACM, WWW 2003, 9 pages.

(Continued)

*Primary Examiner* — Quang N Nguyen
*Assistant Examiner* — Hitesh Patel
(74) *Attorney, Agent, or Firm* — Zete Law, P.L.L.C.; MacLane C. Key

(57) ABSTRACT

Methods are described which enable processing of resources originally accessed by a content access operation. An identifier is generated and used to augment all requests for resources which relate to a particular content access operation. A proxy stores the resources associated with the identifier and then sends the resources to the application that requested them (e.g. a browser). The resources may be requested from the proxy by applications using the identifier so that they can be processed (e.g. thumbnail generation, textual analysis) and the processed data may be stored and/or presented to the user.

20 Claims, 7 Drawing Sheets

(56) References Cited

U.S. PATENT DOCUMENTS

| | | |
|---|---|---|
| 2003/0074416 A1 | 4/2003 | Bates et al. |
| 2003/0200332 A1 | 10/2003 | Gupta et al. |
| 2004/0054779 A1 | 3/2004 | Takeshima et al. |
| 2005/0216850 A1 | 9/2005 | Ramos et al. |
| 2005/0257400 A1 | 11/2005 | Sommerer et al. |
| 2006/0085743 A1 | 4/2006 | Baudisch et al. |
| 2006/0174198 A1 | 8/2006 | Brown et al. |
| 2006/0265417 A1* | 11/2006 | Amato et al. ................. 707/102 |
| 2007/0033264 A1* | 2/2007 | Edge et al. ................... 709/217 |

OTHER PUBLICATIONS

Dziadosz et al., "Do Thumbnail Previews Help Users Make Better Relevance Decisions About Web Search Results?", ACM, SIGIR 2002, 2 pages.

Web Page Thumbnail Generator 1.0.5, website: http://www.topshareware.com/Web-Page-Thumbnail-Generator-download-42937.htm, printed: Sep. 5, 2006, 2 pages.

Woodruff et al., "Using Thumbnails to Search the Web", ACM, SIGCHI 2001, 8 pages.

* cited by examiner

CAPTURE OF CONTENT FROM DYNAMIC RESOURCE SERVICES

RELATED APPLICATION

This application is a continuation of U.S. patent application Ser. No. 11/565,333, filed Nov. 30, 2006, which is incorporated herein by reference.

BACKGROUND

Many applications exist which enhance browsing and searching experiences by providing complementary presentations of the content such as a thumbnail view of the web pages or summaries and concepts extracted from the page content. For example, applications are available which provide an easy way for a user to identify and navigate to potentially relevant parts of a document by displaying thumbnails of the document with the position of keywords/phrases highlighted or otherwise indicated. In another example, thumbnails may be used in presenting a user's navigation history (i.e. the web pages that were accessed and the order in which they were accessed).

A simple technique for thumbnail generation involves capturing the content of the browser window space as soon as a web page has completely loaded. This captured image may then be stored as a bitmap and displayed as a thumbnail as required. However, in many cases the web page is larger than the portion which is visible on screen and therefore the thumbnail will not represent the whole web page.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods are described which enable processing of resources originally accessed by a content access operation. An identifier is generated and used to augment all requests for resources which relate to a particular content access operation. A proxy stores the resources associated with the identifier and then sends the resources to the application that requested them (e.g. a browser). The resources may be requested from the proxy by applications using the identifier so that they can be processed (e.g. thumbnail generation, textual analysis) and the processed data may be stored and/or presented to the user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
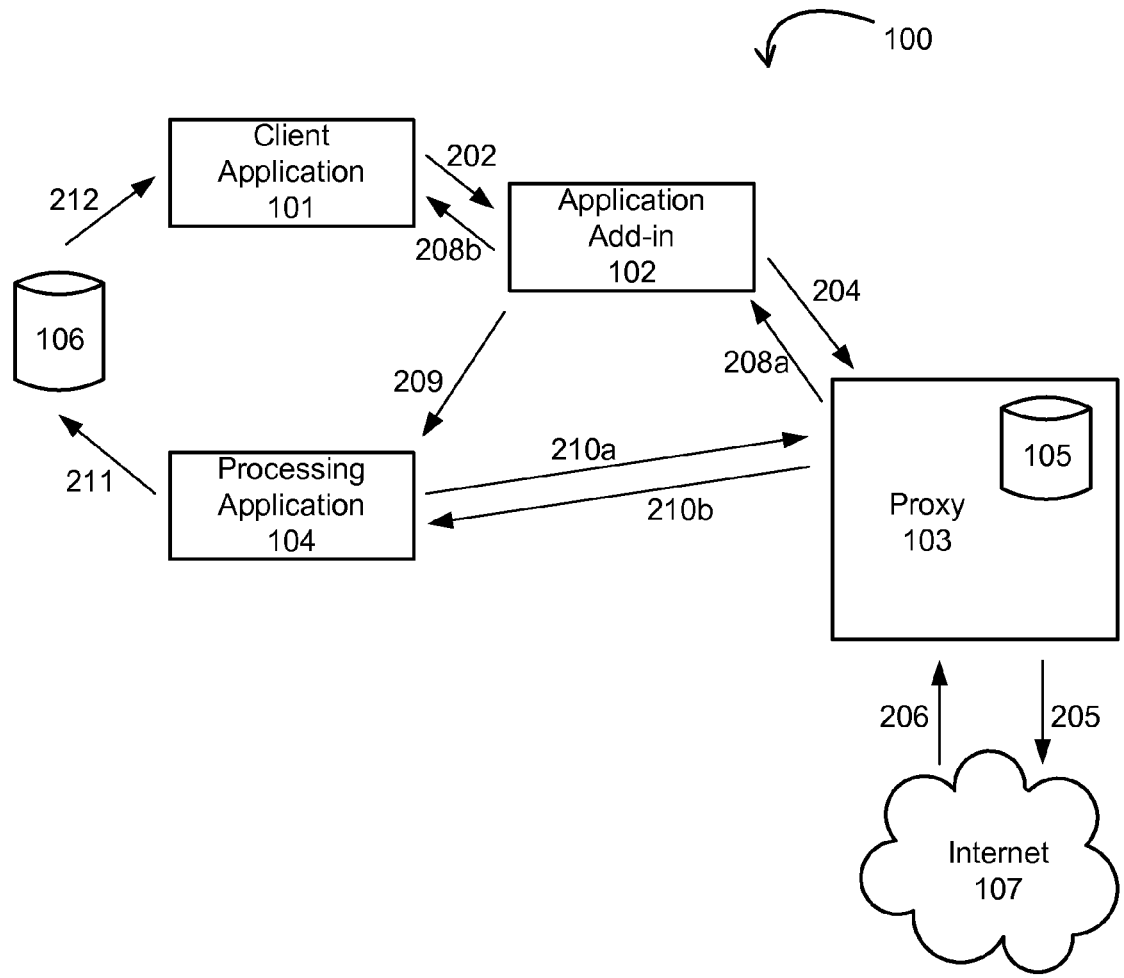
FIG. 1 is a schematic diagram of a first system for capturing web pages.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In order to capture the whole web page, the simple method described above may be modified such that when the web page is loaded, the browser window is momentarily stretched to encompass the entire content of the web page (where the content is longer than the visible page) and this stretched browser window is captured. The browser window size is then restored. This snapshot process which captures the stretched browser window cannot be performed until the entire page plus any included images have been rendered on the screen, as otherwise the captured image of the window will be incomplete. Whilst this method has advantages over the previous method described, it results in a degraded user experience because there is visible disruption to the display (e.g. it flickers) as the window resizes. This is exacerbated if the user scrolls within the web page before the process executes because the page appears to scroll back to the top and if the web page takes a long time to be fully rendered (e.g. if there are a large number of images) the user has more time in which he might scroll within the web page or navigate away from the web page before the window is captured. Problems may also arise where web pages include functionality where re-sizing triggers additional load operations (e.g. loading of a new advert).

An alternative method, which enables the full web page to be captured and avoids the display flicker, uses a second browser window which is hidden from the user. When a user navigates to a web page using their browser, the second browser window is instructed to navigate to the same resource, identified by its URI (Uniform Resource Identifier). Once the page has loaded, the second browser window's size is manipulated as above to encompass the entire content of the web page and the image is captured. As the user cannot see the second browser window, there is no visible display flicker and it is not necessary to restore the size of the browser window after image capture. However, since the second browser makes a separate request for any URI dynamically served content, such as adverts, may be different in the hidden browser to that displayed to the user because for example the server is typically designed to hand back different adverts for subsequent visits by a particular client. Additionally, the method results in URIs being accessed twice for every click the user makes in the visible browser (accessed once in the visible browser and once in the hidden browser) and this may result in items being ordered/purchased twice, paid for twice etc.

In order for an application to generate different presentations of the page content simultaneously with the content display or to re-display the content subsequently, the application needs access to the same content as it was originally obtained from the web server. In a highly distributed environment where content changes independently from the content requests, there is no guarantee that two separate requests to the resource will yield the same content.

Figure 2:
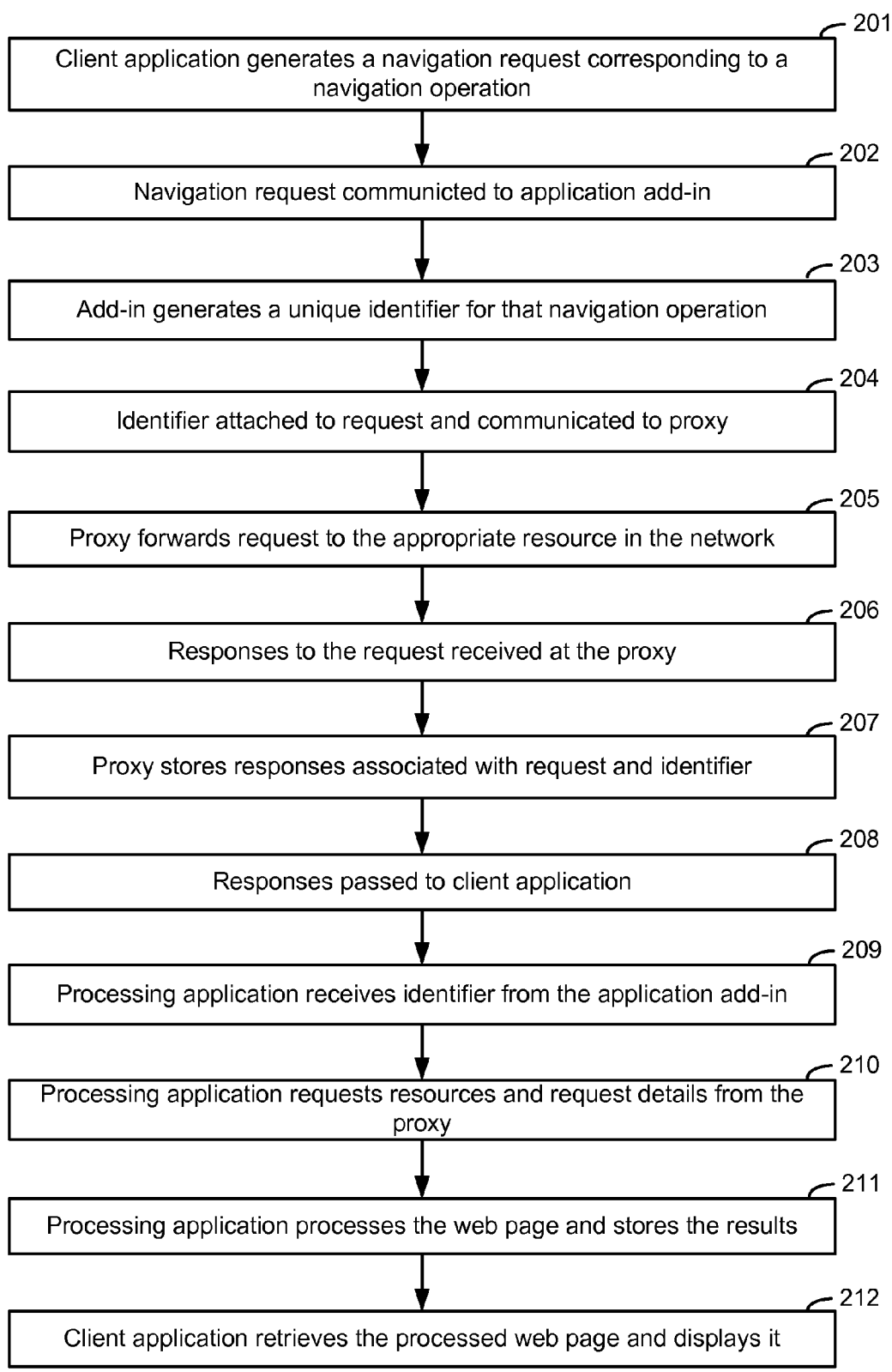
FIG. 2 shows an example flow diagram of a method of capturing web pages.

A method of capturing content such as web pages, which may be used to generate thumbnails (or perform other processing) and which may be used to capture exactly what a user sees, can be described with reference to FIGS. 1 and 2. FIG. 1 shows a schematic diagram of a system 100 comprising a client application 101, an application add-in 102, a proxy 103 and a processing application 104. The proxy 103 may include a cache 105 and the system may include a data store 106. The proxy 103 connects the client application 101 to the internet 107 (or other network of resources). The client application 101 and the processing application 104 (which may also be referred to as an 'extended client application') may both comprise browsers or alternatively they may comprise other applications (e.g. client application 101 may comprise a word processing application) and they may comprise different applications (e.g. the client application may comprise a browser and the processing application may comprise a text analysis engine). FIG. 2 shows an example flow diagram of a method of capturing web pages; the method steps of FIG. 2 are also indicated by arrows in FIG. 1 bearing the same number (where there are two arrows corresponding to a step, these are given the suffix a and b).

The client application 101 generates a navigation request relating to a navigation operation (step 201). Where the client application 101 is a browser, the navigation operation (and hence the navigation request) may be the result of a user typing a URI in the address bar or by clicking on a link. The navigation request is communicated to the application add-in 102 (step 202) which generates a unique identifier for that navigation operation (step 203) and therefore for that navigation request. The unique identifier may, for example, be generated by incrementing a locally or globally stored integer or by any other technique and further examples are described below. The add-in may store this identifier, for example in a history file, associated with details of the navigation request/ operation (e.g. the URI). This unique identifier is then attached to any requests for resources (e.g. one or more requests for web resources) which are associated with the navigation operation (e.g. within the HTTP request header field). The attached unique identifier may also be referred to as a 'tag'. In some examples, a navigation operation (or navigation request) may result in more than one request for resources, e.g. a separate request for page text and included images. The request(s) augmented with the identifier are communicated to the proxy 103 (step 204) and the proxy forwards them to the appropriate network resource (step 205) e.g. to a web server (or other resource server) via the internet 107 or other network. In response to the request(s), the proxy 103 may receive one or more resources (step 206) and these are stored (e.g. in cache 105) associated with the request (e.g. with the URI) and the identifier (step 207). The responses are also passed to the client application (step 208) such that the navigation operation initiated earlier (in step 201) can be completed.

Subsequently, the processing application 104 may receive the identifier from the client application or the application add-in (step 209). The sending of the identifier to the processing application may be automatic as soon as the navigation operation has been completed (e.g. as soon as the web page has loaded completely within the client application). Alternatively, the sending of the identifier may be triggered by user input (e.g. clicking on a control to request a thumbnail), by external stimulus (e.g. a message received from the processing application) or may be triggered within the application (e.g. once a day all identifiers may be sent to the processing application to enable post-processing of web sites). In other examples, the sending of the identifier may be triggered in a different way. In response to receipt of an identifier, the processing application requests the resources and in some cases the request details (e.g. the URI) from the proxy (step 210). Upon receipt of this data, the processing application processes the web page (e.g. creates a thumbnail and/or performs text analysis or recreates the web page previously viewed) and outputs the results (step 211) e.g. to data store 106. Where the results have been stored, they may be stored associated with the identifier (and potentially also the request details and any further information) and the client application 101 may subsequently retrieve the processed web page and display it (step 212) using any suitable reference to identify the stored data. In another example, the processing application may output the results directly to the client application for immediate use/display (e.g. where the processing application provides a function of showing a previously viewed page or a sequence of pages viewed). Where the output of the processing application is stored associated with the identifier, the output may be accessed by the application add-in or the add-in may provide the identifier to the client application in order that the application can access the stored output directly.

Subsequently a second navigation request may be generated and the process described above is repeated. If the second, or any subsequent navigation operation is the same as an earlier navigation operation, the add-in generates a new identifier (in step 203) and therefore the proxy may store more than one copy of the same (or similar) resource (in step 207) where each copy may be associated with a substantially identical navigation operation (e.g. the same URI but a different identifier. As described above, even where a subsequent navigation operation is substantially identical to an earlier application, different content (e.g. different adverts) may be received. Where the same resources are requested in response to different navigation operations (e.g. the same image is included within two different web pages), the proxy may store multiple copies of the same resource, where each copy may be associated with a different operation (e.g. a different URI) and a different identifier.

In some examples, however, if a subsequent navigation operation is the same as a previous navigation, a new identifier may not be generated if predetermined criteria are met. For example, if a second navigation operation is the same as a first navigation operation and the second navigation request is generated within a specified elapsed time since the first request (e.g. within 1 minute), the add-in 102 or the proxy 103 may not cause resources to be requested from the internet 107 or other network but may instead display a copy of the resources previously received and stored associated with the identifier for the first navigation operation. In some applications, a prompt may be displayed to a user to determine whether a new request (and hence identifier) is generated or whether stored data is presented.

By storing copies of all the resources requested, the proxy provides an active archive that a client application (or other application) can communicate with in the same or similar way as it communicated with the original resource/service that provided the original information. These resources will be the same each time they are accessed, as they are representations of what was originally viewed, even where the original resource includes dynamic content and therefore re-loading of the original resource may provide different content. The proxy may also store information relating to the sequence in which navigation operations occur (e.g. through the use of sequential unique identifiers). In an example, the processing application (which may be a browser and may be the same as the client application) may recreate a web page accessed in a previous navigation operation and present it to the user or may present a sequence of web pages showing a sequence of navigation operations.

It will be appreciated that the arrows shown in FIG. 1 to indicate the flow of data between elements is shown by way of example only. Data may flow along different paths to achieve the same result and data flow between any elements may be bidirectional or unidirectional. Furthermore the elements shown in FIG. 1 may be combined in any manner. For example, the cache 105 and the data store 106 may be combined in a single data store, the client application 101 and the application add-in 102 may be combined in a single application etc. Additionally elements shown in FIG. 1 may be replaced by other elements or elements may be absent.

The proxy 103 may replace the cache used with current browser applications which is used in order to speed up future access to the same resource (e.g. when a user revisits the same web page frequently within a short period of time as occurs in back and forward navigation within the Web navigation sessions). In other examples, the proxy 104 may be used in conjunction with any existing cache (e.g. the cache may be used as cache 105 or there may be a separate cache 105).

The client application and the processing application may comprise any application and may comprise different applications. Example applications include: browsers, word processing applications, web services, custom applications, image viewing applications, etc. In other examples the client application and the processing application may be the same application (e.g. two browsers) or may comprise a single application (e.g. a single browser).

Examples of processing operations which may be performed by the processing application include capturing of images of web pages, creation of thumbnails, textual analysis of the web page and presenting a web page or trail of web pages traversed by a user. Although the processing application may operate on exactly what was seen by the user in the client application, in some examples the processing application may also artificially extend the resource access beyond a single web page (e.g. by following web links) and may then process the extended web content (e.g. by performing textual analysis). The processing operations may operate in the background for later use by a client application or may operate to generate results for substantially immediate use by the client application. Use of a processing application which is separate from the client application enables two important aspects. First, the proxy can capture not only the exact content that the user has seen but also a wider content from the resources at that given time. Thus, more information than just the viewed content is available for subsequent viewing. Second, the separation of the processing steps (e.g. the analysis) from the client application operations (e.g. the display) may be beneficial where the processing takes a long time or is processor intensive.

Where the processing operation includes the capture of images of the web pages, these images may be used by the client application to display to the user an exact copy of the web page that they previously viewed or to display a navigation history to the user (e.g. as a sequence of full size images or in the form of thumbnails either sequentially or in the form of a navigation 'map').

The method described above and shown in FIGS. 1 and 2 may be illustrated with an example in which both the client application and the processing application are browser applications. A user may initiate a navigation operation and generation of a navigation request (in step 201) by typing a URI into the address bar, e.g. by typing www.live.com. The identifier generated for this navigation operation may be 00001 (in step 203) and both the request and the identifier, www.live.com and 00001 may be communicated to the proxy (in step 204). This navigation operation may result in multiple resources being received by the proxy, e.g. the web page (e.g. webpage1), an image file for a logo (image1) etc. Each such resource may be stored by the proxy associated with the request (www.live.com) and the identifier (00001). The resources (e.g. webpage1 and image1) are passed back to the browser (in step 208) and displayed to the user. As soon as the web page has loaded in the browser, the identifier (00001) may be sent to the second browser (the processing application) which requests the same page from the proxy, specifying the identifier (or tag) with the request (in step 210). The window size in the second browser is then adjusted to show the entire web page and an image of the web page is captured and a thumbnail stored in a data store for future use (step 211). The user may subsequently click on an icon to display thumbnails of their history (i.e. web pages that they have visited) and this initiates the retrieval of the thumbnail from the data store by the client's browser (i.e. the client application) and the display of the thumbnail (step 211). In another example, the user may click to search a web page and this may initiate the processing of the web page by the processing application e.g. by highlighting search terms within the thumbnail. This processed output may be presented to the user along with the client application window showing a portion (or all) of the web page with the search terms highlighted.

If the user then navigates to another web page (e.g. www.msn.com) a new identifier may be assigned (00002) and details of this identifier may be added to a list stored at the application add-in:

| Request | Identifier |
|---|---|
| www.live.com | 00001 |
| www.msn.com | 00002 |

A copy of the web page and files for any included images will be stored by the proxy associated with the request (www.msn.com) and the new identifier (00002) such that the files stored may, for example, comprise:

| Filename | Request | Identifier |
|---|---|---|
| Webpage1 v1 | www.live.com | 00001 |
| Image1 v1 | www.live.com | 00001 |
| Webpage2 v1 | www.msn.com | 00002 |
| Image2 v1 | www.msn.com | 00002 |

If the user subsequently navigates to the same web page as in an earlier navigation (e.g. to www.live.com), a new identifier may be assigned (00003) and details of this identifier may be added to a list stored at the application add-in:

| Request | Identifier |
|---|---|
| www.live.com | 00001 |
| www.msn.com | 00002 |
| www.live.com | 00003 |

Another copy of the web page and the image file will be stored by the proxy associated with the request (www.live.com) and the new identifier (00003) such that the files stored may, for example, comprise:

| Filename | Request | Identifier |
|---|---|---|
| Webpage1 v1 | www.live.com | 00001 |
| Image1 v1 | www.live.com | 00001 |
| Webpage2 v1 | www.msn.com | 00002 |
| Image2 v1 | www.msn.com | 00002 |
| Webpage1 v2 | www.live.com | 00003 |
| Image1 v2 | www.live.com | 00003 |

The resources stored by the proxy may be periodically deleted or may be deleted after a period of time or after a period of non-use (e.g. after six months). Alternatively, the resources may be archived instead of being deleted.

The client application, application add-in, proxy and processing application may all be installed on a user's computer or in some examples, one or more of these elements may be located elsewhere, e.g. on a second computer connected to the user's computer via the internet 107 or other network (e.g. local area network, intranet etc), as described in more detail below.

Figure 3:
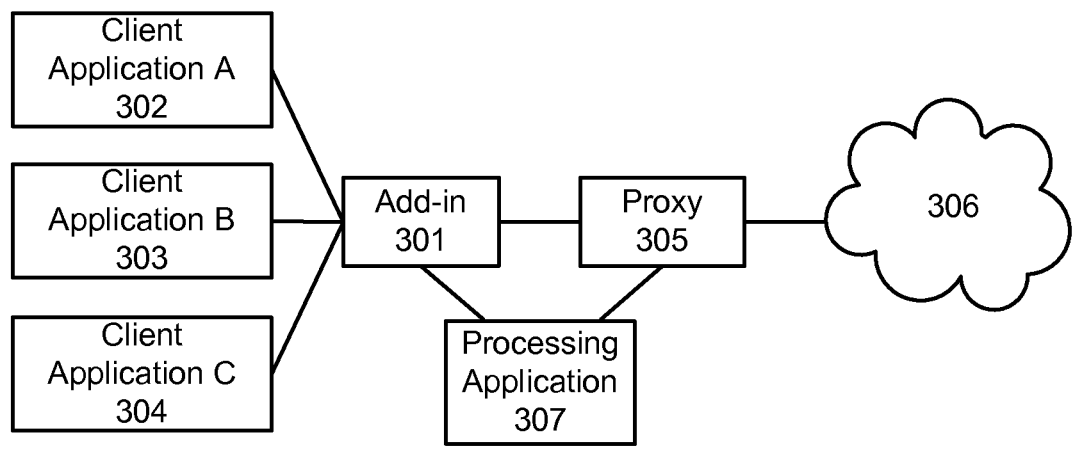
FIG. 3 is a schematic diagram of a second system for capturing web pages.

The application add-in may be integrated within the client application (e.g. as an add-in to a browser) or within the proxy or alternatively the application add-in may be a separate application. FIG. 3 shows a schematic diagram of a system in which the application add-in 301 serves multiple client applications 302-304 and provides an interface between the client applications and the proxy 305 (which is connected to a network 306). The system further comprises a processing application 307. The operation of the system is as shown in FIG. 2 (and described above) with the add-in 301 receiving navigation requests relating to navigation operations from any of the client applications 302-304 and generating an identifier for each navigation operation. The add-in may store, in addition to the navigation request data and the identifier, the identity of the application from which the navigation request/operation originated or other identification information such as a user ID. In another example, the identifier generated may indicate which client application generated the navigation request (e.g. for client application A, the identifier is of the form 1xxxxx, for client application B, the identifier is of the form 2xxxxx etc).

Figure 4:
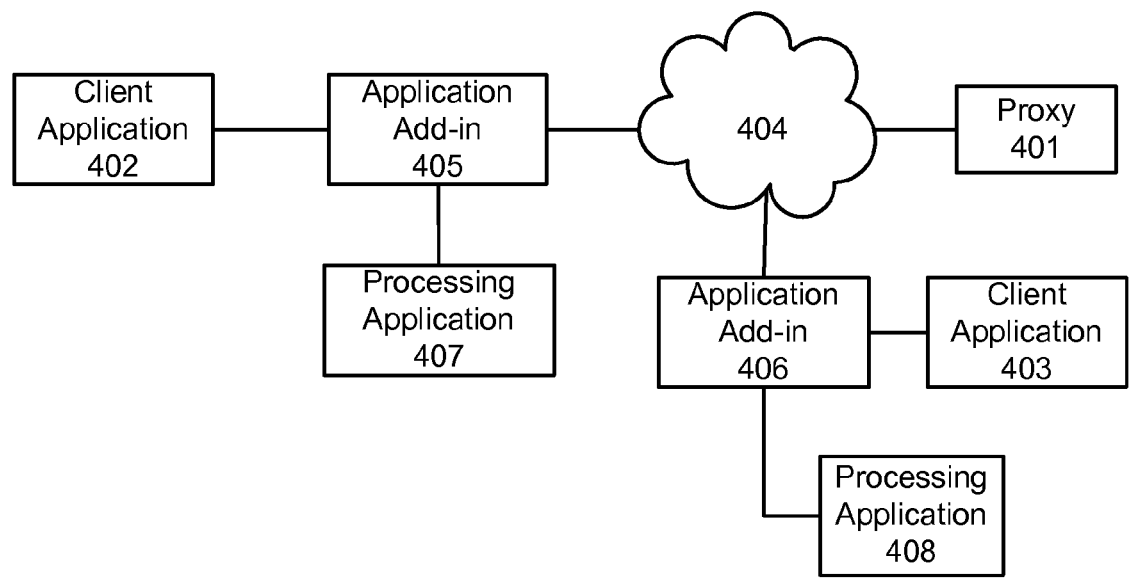
FIG. 4 is a schematic diagram of a third system for capturing web pages.
Figure 5:
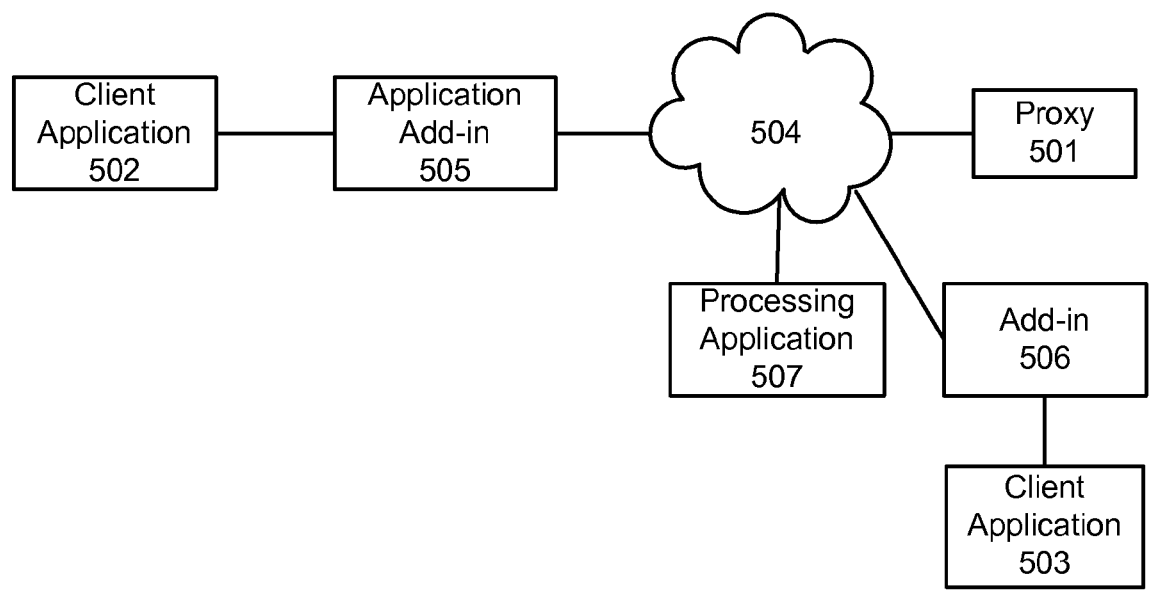
FIG. 5 is a schematic diagram of a fourth system for capturing web pages.
Figure 6:
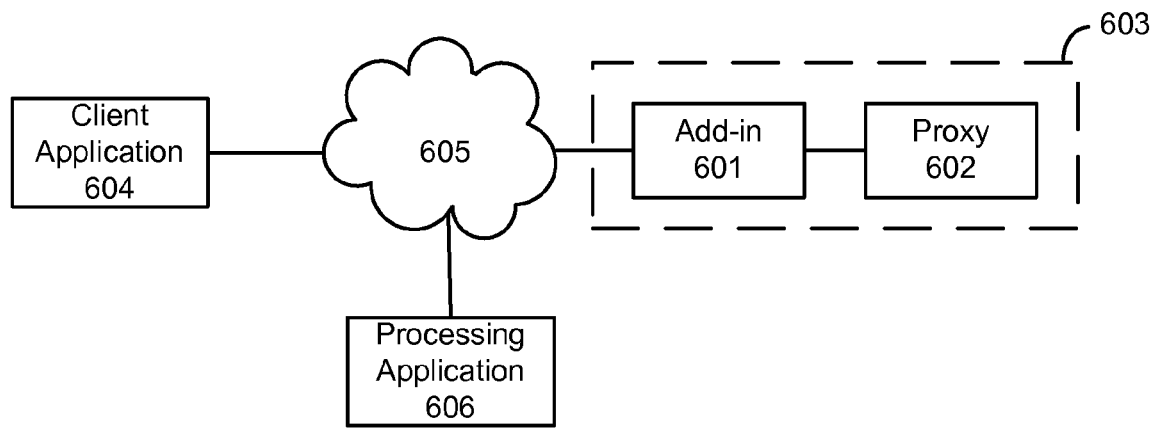
FIG. 6 is a schematic diagram of a fifth system for capturing web pages.

As described above, elements shown in the system 100 of FIG. 1 may be co-located or may be dispersed, as shown in FIGS. 4-6. In the system shown in FIG. 4, the proxy 401 is connected to one or more client applications 402, 403 via a network 404. It will be appreciated that each client application may have an associated add-in 405, 406 or two or more client applications may use a common add-in (in a similar manner to that shown in FIG. 3). In the system shown, each add-in has an associated processing application 407, 408, although in other examples, a processing application may communicate with more than one add-in (or client application) and/or an add-in may communicate with more than one processing application (e.g. a web browser for generation of thumbnails and a separate text analysis engine). The operation of the system shown in FIG. 4 is as shown in FIG. 2 (and described above) with the communications between the proxy 401 and an application add-in 405, 406 being across the network 404 (which may be the internet). Where the proxy serves more than one remote add-in, an add-in may communicate further identification information (e.g. user ID, IP address etc) to the proxy along with the requests for resources each augmented with an identifier (in step 204). In another example, the identifier generated may indicate which client application generated the navigation request (e.g. for client application A, the identifier is of the form 1xxxxx, for client application B, the identifier is of the form 2xxxxx etc).

In the example shown in FIG. 4, the identifiers generated by the application add-ins may be unique to the particular add-in or unique on a larger scale (e.g. globally unique or unique to a particular proxy etc). Where the identifiers are not unique at least to the proxy, the proxy may store the resources (in step 207) associated with the request (e.g. the URI), the identifier and some additional identification information (e.g. user ID, add-in ID etc) such that the combination of associated information (e.g. identifier+user ID) is unique at least to the proxy. Where more than one element is combined to create a unique identifier, a composite identifier may be generated e.g. comprising a hash function of the combined elements.

In the system shown in FIG. 5, the proxy 501 is connected to one or more client applications 502, 503 via a network 504 as in FIG. 4. It will be appreciated that each client application may have an associated add-in 505, 506 or two or more client applications may use a common add-in (in a similar manner to that shown in FIG. 3). The processing application 507 is also connected to one or more client applications or to one or more add-ins via the network. The operation of the system is as shown in FIG. 2 (and described above) with the communications between the proxy 501, processing application 507 and add-ins 505, 506 being across the network 504. As described above with reference to FIG. 4, the add-in may communicate further identification information to the proxy along with the request and the attached identifier (in step 204) and this identification information may be used in the storage of resources received by the proxy. In addition, where the identifiers are not unique to at least the proxy and the processing application, the further identification information may be communicated to the processing application along with the identifier (received in step 209) and then included in the request for resources which is made to the proxy (in step 210).

Whilst a local proxy (as shown in FIGS. 1 and 3) may provide faster response time and performance, use of a remote proxy (as shown in FIGS. 4 and 5) enables the proxy to be shared between multiple client applications and therefore may provide increased efficiency. Similarly a remote processing application may provide increased efficiency as it can be shared between multiple client applications.

It will be appreciated that the connections shown between elements in the systems of FIGS. 3-6 are shown by way of example and shown only some possible communication paths. Communication between elements may take any path including those paths shown in the FIGS. and/or paths not shown.

In the above examples, the proxy stores resources relating to a navigation operation associated with information relating to the navigation request (e.g. the URI) and with the identifier. However, in some examples the resources may be stored associated with the identifier without being also associated with the request. It will be appreciated that the resources may be stored associated with other parameters in addition to the identifier, such as additional identification information (e.g. user ID), as described above (e.g. to create a new unique composite identifier such as identifier+user ID). Association with the request may not be necessary in a number of situations including where the primary resource (from a set of resources associated with a particular identifier) can be clearly identified or where the primary resource has been tagged or otherwise identified. For example, where the request is for a simple HTML page (which does not contain other pages), it will be clear that the HTML page is the primary resource and images are components within that page. In another example, where there is a defined relationship between the component resources (e.g. where the client application is not a web browser), the primary resource will be known. In a third example, the relationship been the component resources may be identified by parsing some or all of the resources. For example where the component resources include more than one HTML page, the pages may be parsed to identify which pages link to each other and therefore the relationship between components can be determined. In a fourth example, when the resources are received, the primary resource may be tagged by the proxy based on the request information, which then need not be retained or used in storing the resources relating to the particular navigation operation.

In the above description, the processing application requests both the resources and the request details (e.g. the URI) from the proxy based on the identifier (in step 210) in order to be able to complete a processing operation (in step 211). However, in another example, the processing application may only request the resources themselves (associated with the particular identifier) and not the request details (e.g. the URI). The request details (e.g. the URI) may used by the processing application to determine the primary resource and as described above, where the primary resource can be clearly identified (e.g. inherently, from a defined relationship between components or due to the primary resource being tagged), the request details are not required. In other examples, the processing application may process resources without requiring information on the primary resource (e.g. textual analysis of all text in any resource) and in these examples the request details may not be required (although they may be available). In a further example, the request details (e.g. the URI) may be passed to the processing application along with the identifier (in step 209) and therefore the processing application need not request these details (e.g. the URI) from the proxy (in step 210).

As described above, the unique identifier may, for example, be generated by incrementing a locally or globally stored integer and the unique identifier may be unique to the generating add-in or unique on a larger scale (e.g. unique to the proxy). In another example, the identifier may comprise a timestamp corresponding to the time that the navigation request was generated or received at the add-in. The identifier may comprise the combination of a time stamp and a user ID (or other identification information) such that the identifier is globally unique. A composite identifier may be created from multiple elements of information (e.g. user ID+timestamp) for example using a hash function.

As described above, the application add-in may be integrated within the client application or within the proxy or alternatively may be a separate application. FIG. 6 shows a system in which the add-in 601 is integrated with the proxy 602 (as indicated by the dotted box 603). In this example, the add-in 601 may communicate the identifier to the client application 604 over the network 605 in order that the client application 605 may initiate processing of the resources by the processing application 606 by sending the identifier to the processing application (or may send the identifier to the processing application in response to a request from that application). Where the add-in is remote from the client application, as in FIG. 6, the add-in may not have session information provided by the client application (e.g. which defines the start and/or end of navigation operations) and therefore the add-in determines which of the requests (and the subsequently received resources) correspond to a single navigation operation. Where the web page requested has a structure which is understood by the add-in or the primary resource is clearly identifiable (as described in more detail above), the add-in at the proxy is able to determine which resources correspond to a particular navigation operation and then stores those identified resources associated with the identifier for the particular navigation operation. In an example, the add-in within the proxy may identify all requests received after a request for a primary resource as belonging to the same navigation operation until the next request for a primary resource is received, which is then considered to correspond to the next navigation operation.

Whilst the above examples describe the accessing of web pages, it will be appreciated that the methods and systems described above are suitable for any type of content irrespective of where it is created or where it is accessed from, including any channels of information (such as broadcast channels) with content that changes independently from the content requests made by client applications. Whilst the above examples relate to navigation requests and operations, this is by way of example only and the methods apply to any type of content access operation or request including, but not limited to, search, navigation and setting of data/content feeds. Any reference to web resources or web servers is by way of example only and refers to any type of content resource and any type of resource server.

Whilst FIGS. 1 and 3-6 show different system arrangements, it will be appreciated that other examples may have different system arrangements and different elements may be co-located and/or running on the same computer. For example, the processing application and the proxy may run on the same computer which is remote from the user's computer which may run the client application and the application add-in. In all arrangements, the operation of the system may be as described above and shown in FIG. 2 although the communication paths and data flow between elements may differ.

Figure 7:
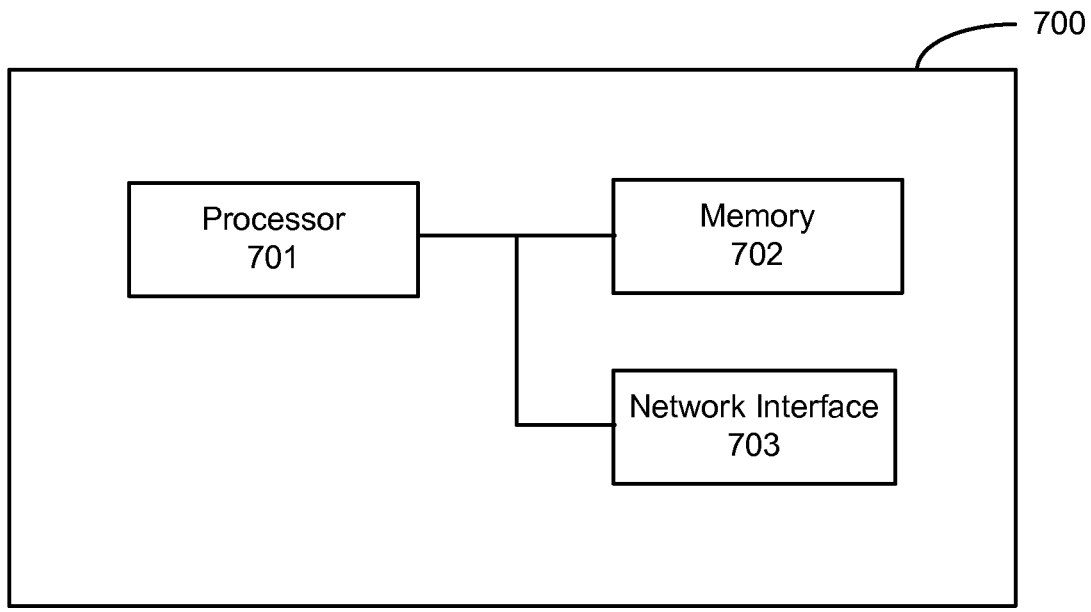
FIG. 7 shows a schematic diagram of a computer suitable for implementation of some or all of the method shown in FIG. 2.

As described above, the systems may be implemented on one or more computers. FIG. 7 shows a schematic diagram of a suitable computer 700 which comprises a processor 701, a memory 702 and a network interface 703. The memory is arranged to store executable instructions which when executed cause the processor to carry out one of more of the method steps described above. The memory may also be arranged to store resources (e.g. to act as data stores 105 and 106 shown in FIG. 1). It will be appreciated that the computer may comprise many elements in addition to those shown in FIG. 7.

Although the present examples are described and illustrated herein as being implemented in an internet or network based system, the system described is provided as an example and not a limitation. As those skilled in the art will appreciate, the present examples are suitable for application in a variety of different types of computing systems and networks.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer comprising:
a processor configured to execute instructions;
instructions that, when executed by the processor, direct the computer to perform operations comprising:
receiving data from a client application relating to a content access operation;
generating an identifier for the content access operation;
receiving a request from the client application for a resource associated with the received data;
augmenting the request with the identifier;
transmitting the identifier, by the client application, to a processing application configured to process the data in response to receiving the identifier, the processing application being separate from the client application;
providing, by the client application, content to be displayed for viewing;
processing the data at the processing application to create processed data, the processed data comprising a captured image of the resource, wherein the captured image includes more content than the content displayed for viewing at the client application, the content displayed for viewing comprising a portion of the resource, the captured image containing the content displayed for viewing at the client application and another portion of the resource comprising viewable web page content; and
storing the resource associated with the identifier.

2. A computer as recited in claim 1, the operations further comprising:
forwarding the request to a resource server;
receiving the resource from the resource server, in response to the request; and
displaying the content for viewing via the client application.

3. A computer as recited in claim 1, wherein the client application comprises a browser.

4. A computer as recited in claim 1, wherein the processing application comprises a browser.

5. A computer as recited in claim 1, further comprising causing, at the processing application, operations comprising:
activating a web link associated with the resource and accessing an extended web resource based on the web link; and
performing a textual analysis of the resource and the extended web resource.

6. A computer as recited in claim 1, wherein the storing the resource associated with the identifier comprises storing the resource in a cache.

7. A computer as recited in claim 1, wherein the storing the resource stores more information than the content being viewed, the more information comprising at least a second portion of the resource.

8. A memory having machine-executable instructions encoded thereon that upon execution by a processor direct a machine to perform operations comprising:
receiving a navigation request for a web page from a first browser;
augmenting the navigation request with a unique identifier associated with the navigation request;
obtaining the web page from a web server in response to the navigation request;
transmitting the web page and the unique identifier to the first browser;
causing display of a first portion of the web page via the first browser;
sending the unique identifier to a second browser;
in response to receipt of the unique identifier, receiving at the second browser the web page associated with the unique identifier;
adjusting by the second browser, a size of a window of the second browser to encompass the web page in entirety;
capturing by the second browser, a thumbnail image of the adjusted window of the second browser, wherein the captured thumbnail image contains the first portion of the web page displayed at the first browser and a second portion of the web page comprising viewable web page content;
causing display of the thumbnail image at the first browser;

navigating to a web link associated with the web page at the second browser and accessing a web resource from the web link; and processing the web page and the web resource from the web link.

9. A memory as recited in claim 8, wherein storing the web page associated with the unique identifier comprises storing the web page associated with the unique identifier and further associated with the navigation request.

10. A memory as recited in claim 8, wherein the second browser comprises a hidden browser.

11. A memory as recited in claim 8, further comprising:
receiving a second navigation request for the web page from the first browser, the second navigation request comprising a second unique identifier;
obtaining a second copy of the web page from the web server in response to the second navigation request;
storing the second copy of the web page associated with the second unique identifier; and
sending the second unique identifier to the second browser.

12. A memory as recited in claim 11, wherein the first unique identifier and the second unique identifier comprise identifiers generated by an add-in to the first browser.

13. A memory as recited in claim 11, further comprising:
in response to receipt of the second unique identifier, requesting the second copy of the web page associated with the second unique identifier by the second browser; and
causing display of the second copy of the web page associated with the second unique identifier at the second browser.

14. A memory as recited in claim 13, further comprising:
adjusting the size of the window of the second browser to display the second copy of the web page in entirety;
capturing a thumbnail image of the entire second copy of the web page from the second browser;
accessing the thumbnail image of the entire second copy of the web page at the first browser; and
causing display of the thumbnail image of the entire second copy of the web page at the first browser.

15. A processor configured to execute instructions, the instructions upon execution by the processor, directing a computer to perform acts comprising:
receiving an identifier from an application add-in at a processing application, the identifier associated with a content access operation;
responsive to receiving the identifier, requesting at least one resource associated with the content access operation;
processing the at least one resource to create processed data, wherein the processing comprises:
adjusting a size of a window of the processing application to show an entire web page content; and
capturing a thumbnail image of the entire web page content based on the processed data shown by the processing application, the processed data comprising a captured image of the at least one resource, the captured image including more content than a web page content for display, the captured image containing the web page content for display and additional viewable web page content for additional display, wherein the additional viewable web page content is based at least in part on the at least one resource.

16. A processor according to claim 15, wherein the processed data comprises data generated by analyzing text of the resource.

17. A processor according to claim 15, the acts further comprising deleting the processed data after a preset time of non-use of the processed data.

18. A processor according to claim 15, the acts further comprising:
accessing the thumbnail image of the entire web page content based on the processed data; and
displaying the thumbnail image of the entire web page content based on the processed data.

19. A processor according to claim 15, the acts further comprising receiving, by the processing application, the at least one resource from a cache.

20. A processor according to claim 15, the acts further comprising:
sending a request to a web server for at least one resource associated with the content access operation, the request comprising the identifier;
receiving the at least one resource from the web server, in response to the request;
passing the at least one resource to a client application;
completing the content access operation by the client application; and
transmitting the identifier from the client application to a processing application.

* * * * *